Patented Oct. 29, 1940

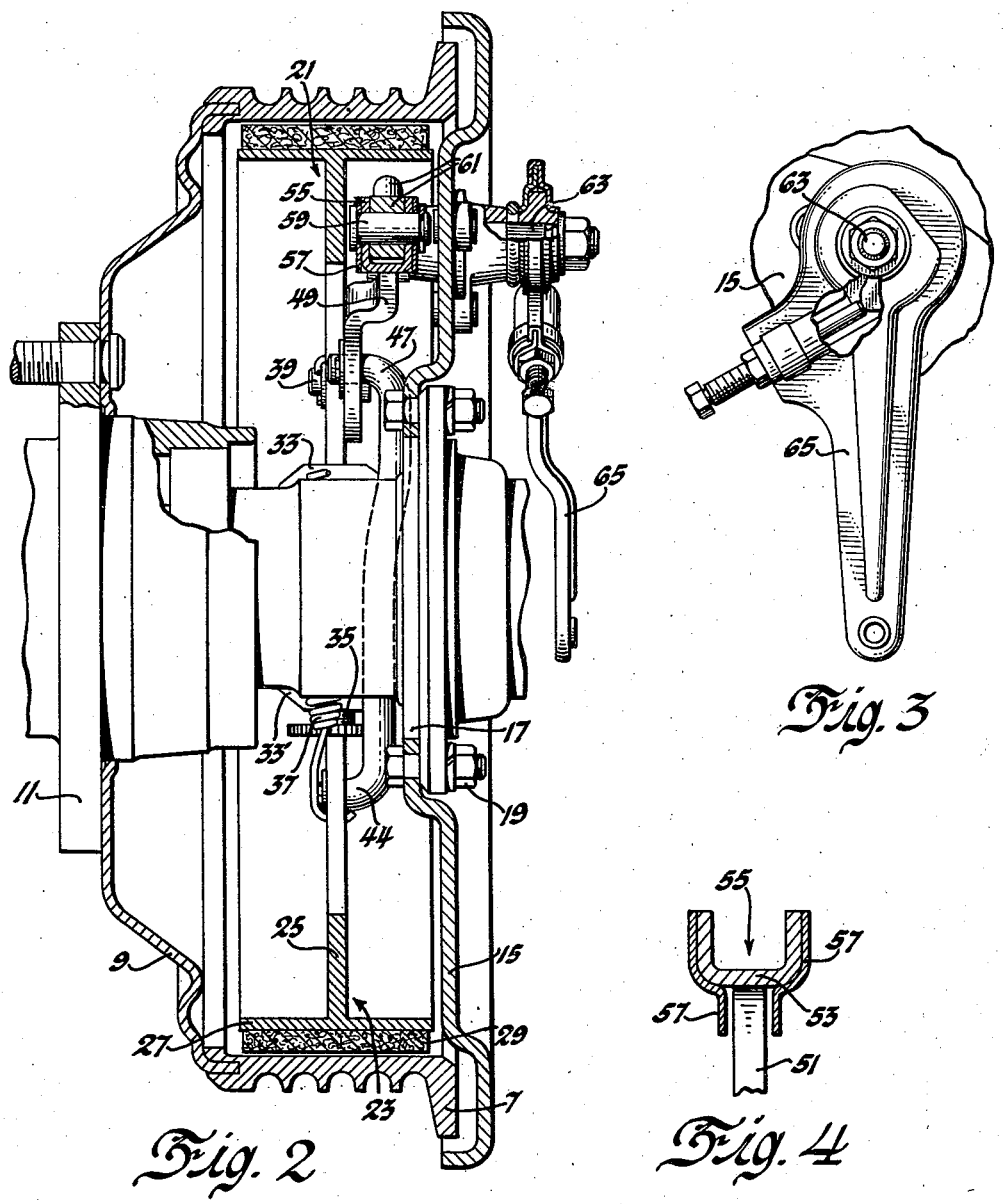

2,219,764

UNITED STATES PATENT OFFICE 2,219,764

BRAKE

Leon A. Chaminade, Birmingham, Mich., assignor to General Motors Corporation, Detroit, Mich., a corporation of Delaware Application September 16, 1939, Serial No. 295,221

5 Claims. (Cl. 188—106)

This invention relates to brakes of the drum and shoe type and has been designed as a brake to retard the travel of vehicles.

An object of the invention is to improve the means by which a pair of shoes, each self energizing for each direction of drum rotation, may be applied equally by mechanical linkage actuated by a service pedal or by an emergency lever in cases where the shoes are normally actuated by the service pedal through the use of other applying means such as a conventional hydraulic brake applying system.

Another object is the accomplishment of the major object by a construction which is efficient, simple and comparatively inexpensive.

Other objects and advantages will be understood from the description which follows.

On the accompanying drawings:

Figure 2 is a section on line 2—2 of Figure 1.

Figure 3 is a view in elevation of an adjustable lever arm.

Figure 4 is a section on line 4—4 of Figure 1.

Figure 1:
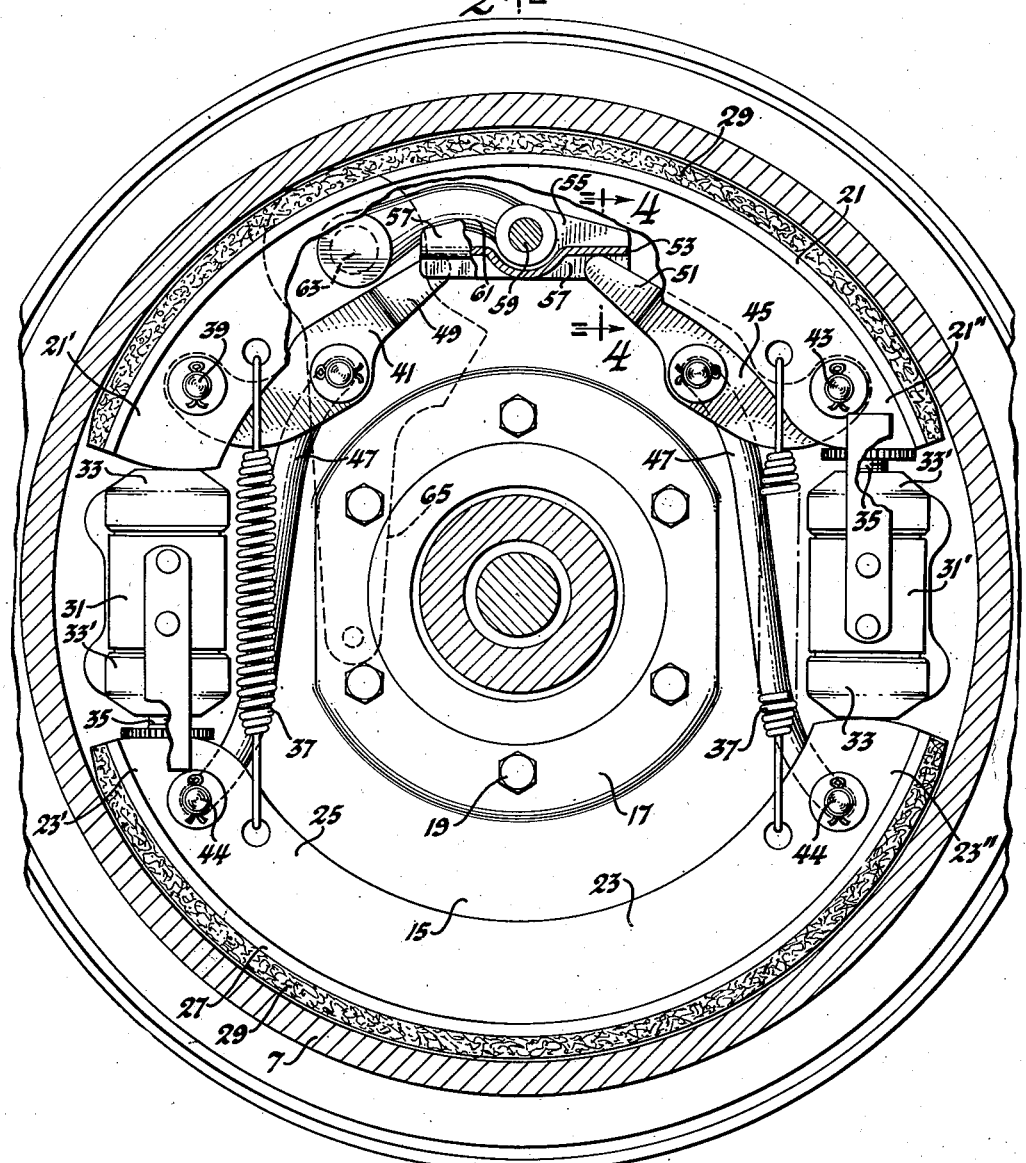
Figure 1 is a transverse section through a brake drum showing the shoe assembly in elevation.

Numeral 7 is used to designate the flange of a brake drum attached to a rotatable wheel hub 11 by a disc 9. A fixed drum cover or backing plate 15 is secured to a non-rotatable axle housing 17 by fastening means 19. It will be understood that an equivalent of cover 15 will be secured to the steering knuckle in the case of front wheel brakes. Within the drum are shoes 21 and 23 which together occupy the greater part of the arc of the flange 7. The shoes have webs 25, and flanges 27 carrying friction facings 29. One pair of adjacent shoe ends are marked by numerals 21' and 23', the other pair by numerals 21" and 23". Between the pairs of adjacent ends are wheel cylinders 31 and 31' constituting parts of a hydraulic brake system. These wheel cylinders are secured to the backing plate. In the case of each cylinder there is a cap-shaped plunger 33 at one end. These plungers are adapted to be moved by a piston not shown and they contact diametrically opposite shoe ends 21' and 23". The shoe ends 21" and 23' are pushed outwardly by similar plungers 33'. These plungers 33', also advanced by pistons, do not directly engage the shoe ends but they have adjustable threaded connections with members 35 which engage the shoe ends. Retracting springs 37 function to withdraw the shoes from the drum surface, the movement being limited by the engagement of the plungers 33, 33' with the ends of the cylinders.

While other forms of anchorage may be used, the embodiment illustrated uses the wheel cylinder ends to take the braking torque. Since each shoe may anchor at either end and since the applying force is applied to both pairs of adjacent ends, the brake is fully self energizing. Each shoe being subject to the energizing effect of the rotating drum for each direction of drum rotation. When the brake is applied with the drum rotating counterclockwise shoe 21 anchors at its end 21' which pushes plunger 33 against cylinder 31. At the same time shoe end 23" anchors on cylinder 31'. For clockwise rotation the other shoe ends anchor and the first mentioned ends are moved away from the respective cylinder ends.

With the above construction there is also provided a mechanical linkage for applying the brakes so that they may operate in precisely the same way; so that the mechanically applied force shall be equalized; so that each shoe may anchor at one or the other of its ends; and so that each may be self energizing for each direction of drum rotation. To the end 21' of shoe 21 is pivoted at 39 a lever 41. To shoe end 21" is pivoted at 43 a lever 45. At intermediate points of levers 41 and 45 are pivoted links 47 which are terminally pivoted to the shoe ends 23' and 23" as at 44. The free ends 49 and 51 of levers 41 and 45 are slidingly supported on faces 53 on either side of the pivot center of an equalizer 55. Escape of the ends 49 and 51 from faces 53 is prevented by guards 57. The equalizer is medially pivoted at 59 to a lever arm 61 extending from a rock shaft 63 journalled in cover 15. Outside the cover the rock shaft has an adjustable lever arm designated as a whole by numeral 65. Lever arm 65 is adapted to be connected to a suitable applying means such as a conventional emergency lever when the mechanical brake applying means supplements the service system as shown by the drawings.

By the arrangement shown for mechanical operation the pairs of adjacent shoe ends are spread by the assembly of levers and links and the action is equalized by the equalizer 55. The shift of anchorage from one pair of diametrically opposite ends to the other pair when checking opposite direction of drum rotation is provided by the sliding of lever ends 49 and 51 on the equalizer.

I claim:

1. In a brake, a rotatable drum, a cover, shoes to frictionally engage said drum, means whereby one end of each shoe anchors for one direction of drum rotation and the other ends anchor for the opposite direction of drum rotation, a lever pivoted to each end of one shoe, a link pivoted at one end to each end of the other shoe, the other ends of said links pivoted to intermediate points of said levers, the remaining and adjacent ends of said levers being spaced, a floating equalizer slidably engaging at its opposite ends the otherwise free spaced ends of said levers and means to move said equalizer to spread said shoes into contact with said drum.

2. The invention defined by claim 1 together with other means to spread said shoes into drum contact.

3. The invention defined by claim 1 together with hydraulic cylinders fixed in position adjacent each pair of adjacent shoe ends whereby said shoes may be spread into drum contact, said cylinders serving the further purpose of shoe anchors.

4. In a brake, a rotatable drum, a cover, shoes to frictionally engage said drum, means whereby one end of each shoe anchors for one direction of drum rotation and the other ends anchor for the opposite direction of drum rotation, a lever pivoted to each end of one shoe, a link pivoted at one end to each end of the other shoe, the other ends of said links pivoted to intermediate points of said levers, a floating equalizer slidably engaging the otherwise free ends of said levers and means to move said equalizer to spread said shoes into contact with said drum, said last named means comprising a rock shaft journalled in said cover, a lever arm secured thereto outside said drum and cover enclosure whereby said rock shaft may be rotated, a second arm on said rock shaft within the drum enclosure, said second arm being pivoted to said equalizer.

5. In a brake, a rotatable drum, a fixed cover, shoes having two pairs of adjacent ends, said shoes being operable to frictionally engage said drum, levers terminally pivoted to the ends of one shoe, links terminally pivoted to the ends of the other shoe and also pivoted to intermediate points of said levers, the remaining and adjacent ends of said levers being spaced, a floating equalizer engaged by the free spaced ends of said levers, means to move said equalizer and spread said shoes, means adjacent each pair of adjacent shoe ends and secured to said cover to receive brake torque from one or the other of said shoes dependent upon the direction of drum rotation, at least one of said torque receiving means comprising a hydraulic brake applying cylinder.

LEON A. CHAMINADE.